(12) United States Patent
Viard (10) Patent No.: US 10,563,641 B2
(45) Date of Patent: Feb. 18, 2020

(54) DISTRIBUTION DEVICE FOR HYDRAULIC MACHINE

(71) Applicant: POCLAIN HYDRAULICS INDUSTRIE, Verberie (FR)

(72) Inventor: Julien Viard, Verberie (FR)

(73) Assignee: POCLAIN HYDRAULICS INDUSTRIE, Verberie (FR)

( * ) Notice: Subject to any disclaimer, the term of this patent is extended or adjusted under 35 U.S.C. 154(b) by 393 days.

(21) Appl. No.: 15/329,828

(22) PCT Filed: Jul. 28, 2015

(86) PCT No.: PCT/FR2015/052086
§ 371 (c)(1),
(2) Date: Jan. 27, 2017

(87) PCT Pub. No.: WO2016/016573
PCT Pub. Date: Feb. 4, 2016

(65) Prior Publication Data
US 2017/0248241 A1    Aug. 31, 2017

(30) Foreign Application Priority Data
Jul. 31, 2014 (FR) .................................... 14 57462

(51) Int. Cl.
*F04B 1/107* (2006.01)
*F04B 1/047* (2006.01)
(Continued)

(52) U.S. Cl.
CPC .............. *F04B 1/107* (2013.01); *F03C 1/045* (2013.01); *F03C 1/047* (2013.01); *F03C 1/0447* (2013.01);
(Continued)

(58) Field of Classification Search
CPC ........ F03C 1/045; F03C 1/0447; F03C 1/047; F03C 1/0636; F03C 1/0657; F01B 13/06;
(Continued)

(56) References Cited

U.S. PATENT DOCUMENTS 3,296,937 A * 1/1967 Guinot .................... F03C 1/045
91/446
3,403,599 A * 10/1968 Guinot .................... F03C 1/045
91/418
(Continued)

FOREIGN PATENT DOCUMENTS

FR         1460752 A    12/1966
FR         1563866 A     4/1969
(Continued)

OTHER PUBLICATIONS

International Search Report issued in corresponding International App. No. PCT/FR2015/052086 dated Nov. 13, 2015 (6 pages—English Translation included).

*Primary Examiner* — Alexander B Comley
(74) *Attorney, Agent, or Firm* — The Webb Law Firm (57) ABSTRACT

The device has an internal distributor to be disposed in a casing portion (10A), and has a body (15) that has an outside axial face (15B) provided with two grooves (17, 19) respectively for feed and for discharge. The distributor has distribution ducts (23A, 23B, 23C) that open out in a distribution radial face and a cylinder capacity selector that has a slide (50) suitable for being moved in an axial bore (53) for connecting the distribution ducts to one or the other of the grooves. The device further has a control chamber (52) provided between a first end wall (15') of the bore and the first end (50A) of the slide, and an opposing spring (55) disposed in a return chamber (52') situated at the second end (53") of the bore and closed, at the end closer to the (Continued)

distribution face (15A), by a second end wall (55') of the distributor.

12 Claims, 4 Drawing Sheets

(51) Int. Cl.
| | | |
|---|---|---|
| *F03C 1/047* | (2006.01) | |
| *F03C 1/40* | (2006.01) | |
| *F03C 1/06* | (2006.01) | |
| *F04B 1/06* | (2006.01) | |
| *F16K 11/085* | (2006.01) | |
| *F16K 31/122* | (2006.01) | |

(52) U.S. Cl.
CPC ............ *F03C 1/0636* (2013.01); *F04B 1/047* (2013.01); *F04B 1/06* (2013.01); *F16K 11/085* (2013.01); *F16K 31/1221* (2013.01)

(58) Field of Classification Search
CPC .. F04B 1/047; F04B 1/06; F04B 1/107; F04B 13/061; F04B 13/063; F16K 11/085; F16K 31/1221
USPC .................. 91/498, 480, 481, 484, 491, 497
See application file for complete search history.

(56) References Cited

U.S. PATENT DOCUMENTS

| | | | | |
|---|---|---|---|---|
| 3,593,621 | A * | 7/1971 | Praddaude | F03C 1/045 91/448 |
| 3,899,958 | A * | 8/1975 | Spencer | F03C 1/0406 91/492 |
| 4,326,450 | A * | 4/1982 | Bacquie | B60K 7/0015 91/487 |
| 4,404,896 | A * | 9/1983 | Allart | F03C 1/045 91/491 |
| 4,532,854 | A * | 8/1985 | Foster | F03C 1/045 91/472 |
| 4,807,519 | A * | 2/1989 | Wusthof | F03C 1/045 91/492 |
| 5,186,094 | A * | 2/1993 | Allart | F03C 1/045 91/491 |
| 6,619,184 | B1 * | 9/2003 | Legner | F03C 1/045 60/436 |

FOREIGN PATENT DOCUMENTS

| | | |
|---|---|---|
| FR | 2606092 A1 | 5/1988 |
| FR | 2673684 A1 | 9/1992 |
| FR | 2678322 A1 | 12/1992 |
| FR | 2911941 A1 | 8/2008 |
| FR | 2951798 A1 | 4/2011 |

* cited by examiner

DISTRIBUTION DEVICE FOR HYDRAULIC MACHINE

CROSS-REFERENCE TO RELATED APPLICATIONS

This application is the U.S. national phase entry under 35 U.S.C. § 371 of International Application No. PCT/FR2015/052086, filed on Jul. 28, 2015, which claims priority to French Patent Application No. 1457462, filed on Jul. 31, 2014, the entireties of which are incorporated by reference herein.

The present invention relates to a distribution device for a hydraulic machine, which device comprises an internal distributor configured to be disposed in a casing portion, the internal distributor comprising a body that has an outside axial face provided with two main grooves respectively for fluid feed and for fluid discharge, and a distribution radial face, the distributor having distribution ducts that open out in the distribution face and a cylinder capacity selector that comprises a slide suitable for being moved in an axial bore in the distributor, for connecting the distribution ducts to one or the other of the main grooves, the device further comprising a control chamber suitable for being fed with fluid to cause the slide to be moved, and at least one return spring exerting an opposing force that opposes such movement.

A device of this type is known, for example from Documents FR 2 673 684 and FR 2 951 798. In known manner, the machine further comprises a cylinder block with a communication face into which cylinder ducts open out for being put into fluid-flow connection with the distribution ducts, while the cylinder block is rotating relative to the distributor. To ensure that this fluid-flow connection is established under good conditions, while minimizing leakages at the interface between the communication face and the distribution face, said distribution face must be pressed against the communication face. While the cylinder block and the distributor are rotating relative to each other, the orifices of the distribution ducts that are situated in the distribution face find themselves, in alternation, facing orifices of the cylinder ducts and facing uninterrupted portions of the communication face. The fluid pressure coming from the distribution ducts being exerted on said uninterrupted portions tends to move the distributor away from the cylinder block. This moving-away effect must be compensated for by opposite hydraulic pressing which, by being exerted on certain surfaces of the distributor, tends to move it closer to the cylinder block. In other words, the hydraulic pressing must be balanced.

In such known devices, the cylinder selector must be assembled with the distributor while the hydraulic machine is being assembled. In particular, the control chamber is defined by a radial wall portion of the distributor that is opposite from the distribution face, so that the increase in the fluid pressure in said chamber due to the slide being caused to move can contribute to moving the distributor towards the cylinder block of the machine, thereby generating an interfering thrust that is detrimental to balancing the hydraulic pressing.

In known devices, that interfering thrust is taken up, via the distributor, by the cylinder block against which the distributor presses. That taken-up thrust is exerted on the rolling bearings that support the relative rotation of the cylinder block and of the cam, and tends to move the various portions of the casing away from one another. As a result, there is a risk of deformation, of wear, and of seizure, in particular at the places where the cylinder block and the distributor co-operate with each other.

Adjustments are relatively complex to make and depend on how the distributor and the cylinder capacity selector are assembled.

An object of the invention is to remedy the above-mentioned drawbacks, at least to a significant extent.

This object is achieved by the fact that the control chamber is situated at a first end of the bore and is closed, at the end opposite from the distribution face, by a first end wall of the distributor, the control chamber being provided between the first end wall and the first end of the slide that faces towards said end wall, and by the fact that the return spring is disposed in a return chamber situated at the second end of the bore and closed, at the end beside the distribution face by a second end wall of the distributor.

Thus, the internal distributor may be assembled and manipulated as a unit, with its body and the slide of the cylinder capacity selector, the bore being closed at both of its ends by the first and second end walls. In addition, the fluid pressure in the control chamber acts between the slide and the first end wall of the bore, while the spring is received in the return chamber closed by the second end wall. Thus, both the forces that are exerted in the control chamber by the hydraulic fluid, and also the forces that are exerted in the return chamber by the spring apply only to surfaces that are part of the unit constituted by the assembled distributor. As a result, these forces are internal to the distributor and do not have any effect on pressing distribution face of the distributor against the communication face of the cylinder block in balanced manner.

Optionally, the bore is disposed in the center of the internal distributor.

The structure is then extremely simple, it being possible for the distributor to be circularly symmetrical about the axis of rotation of the rotor of the hydraulic machine.

Optionally, the distribution ducts and the axial bore are formed integrally in one piece forming the body of the internal distributor, and in that at least one of the first and second end walls is formed by a wall element that is separate and mounted on the body at one end of the axial bore.

Thus, the number of parts constituting the distributor is small, so that manufacturing and assembly are simplified.

The axial bore may be blind, one of the end walls, in particular the first end wall, being formed in the body.

This further limits the number of parts.

Optionally, at least one of the ends of the axial bore, in particular the second end of the bore, is an open end that has a wider end portion defined by a shoulder, the end wall of said open end being formed by a separate wall element that is disposed in the wider end portion and that is held locked against the shoulder by locking means such as a circlip.

It is thus particularly simple to form the end wall in question and to assemble it with the remainder of the distributor.

Optionally, the separate wall element co-operates with the body via a sealing gasket.

This applies in particular when the separate wall element is the first end wall, defining the control chamber.

Optionally, the body is provided with a control duct that connects the control chamber to a hole in the outside axial face of the body, which hole is disposed in a single cylindrical bearing surface of said outside face.

This duct is simple to form and the cylindrical bearing surface of the outside face in which the hole is disposed can be used as a surface against which sealing gaskets press. In addition, insofar as the cylindrical bearing surface is a single bearing surface (i.e. it is defined on an axial surface that is situated substantially at the same diameter), the fluid pressure in the control duct does not generate any axial thrust on the distributor.

The invention can be well understood and its advantages appear more clearly on reading the following detailed description of an embodiment that is shown by way of non-limiting example. The description refers to the accompanying drawings, in which.

Figure 1:
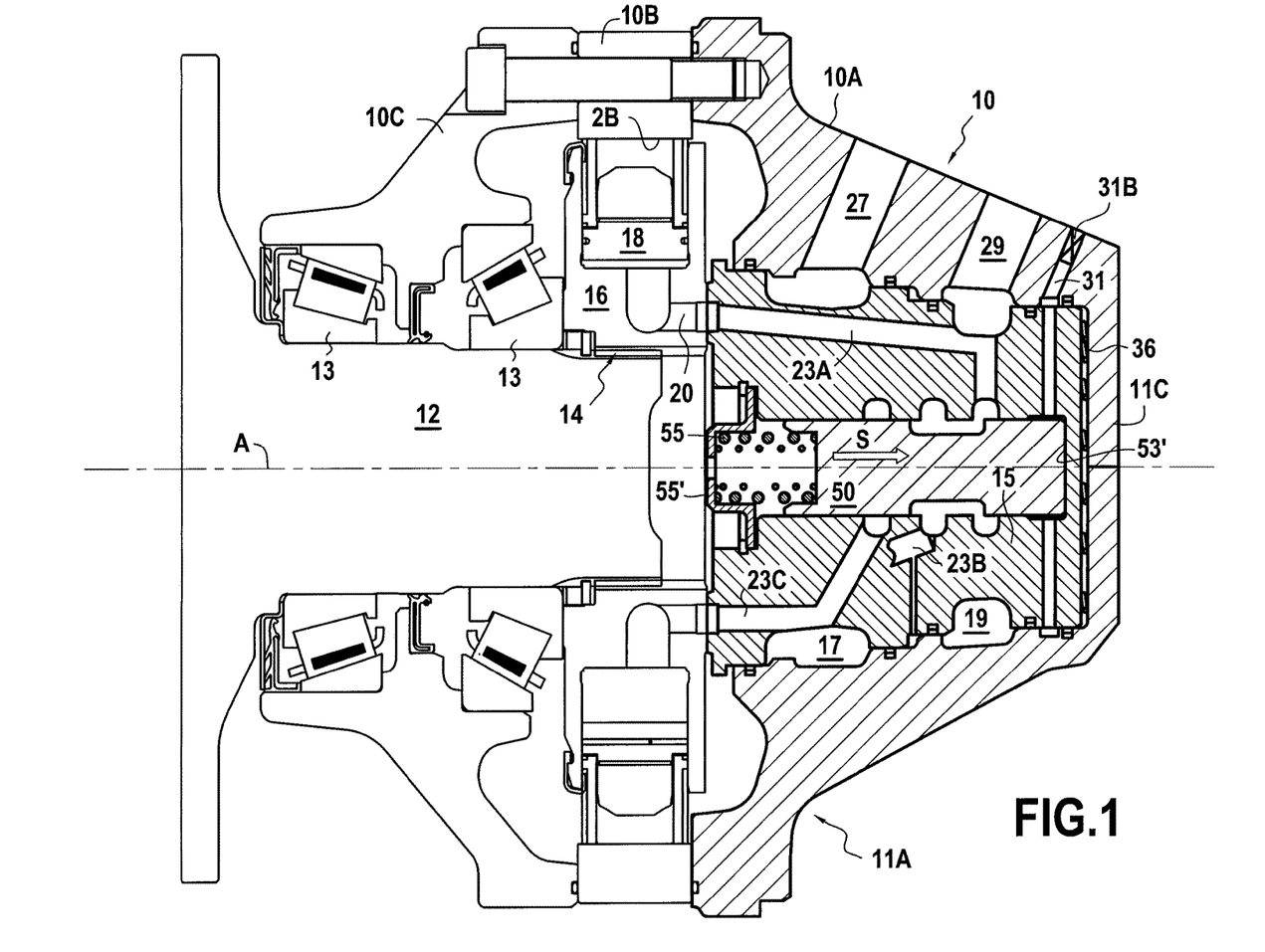
FIG. 1 is an axial section view of a hydraulic machine with a distribution device of the invention that comprises an internal distributor of a first type, showing the large cylinder capacity configuration.

Firstly, FIG. 1, which shows a hydraulic machine, in particular a hydraulic motor, is described. However, it should be understood that the invention also applies to other types of hydraulic machine, and in particular to hydraulic pumps.

In a manner known per se, the motor of FIG. 1 has a casing 10 in three portions, respectively 10A, 10B, and 10C. The first portion 10A of the casing is a distribution casing device. The second portion 10B carries an undulating cam 2B on its inside periphery. The third portion 10C serves, in this example, to house the outlet shaft 12 of the hydraulic motor, rotatably holding said shaft via bearings 13. The outlet shaft co-operates, in particular via fluting 14 or the like, with the inside periphery of a cylinder block 16 disposed in the portion 10B of the casing. Thus, the cylinder block 16 and the shaft 12 rotate together relative to the casing 10 about an axis of rotation A. In a manner known per se, the cylinder block has a plurality of radial cylinders 18 in which pistons are disposed that co-operate with the cam 2B. The cylinder block has cylinder ducts 20 that put the cylinders into communication with the communication face 16A of the cylinder block.

The casing portion 10A has two main holes, respectively 27 and 29 that open out in the inside axial face 11B of the casing portion 10A, respectively via a first main orifice 27A and via a second main orifice 29A. As can be seen, these two main orifices are disposed in succession in the direction S going away from the open end 11A of the casing portion 10A.

An internal distributor is disposed in the casing portion 10A while being constrained not to move in rotation relative to said casing portion 10A. The body 15 of the internal distributor has an outside axial face 15B in which two main grooves are provided, respectively 17 and 19, that are connected permanently to respective ones of the main holes 27 and 29.

The internal distributor has distribution ducts that are provided in its body 15 and that have their orifices opening out in a distribution radial face 15A of the internal distributor that is situated at the open axial end 11A of the casing portion 10A. This radial face is pressed against the communication face 16A of the cylinder block.

Via the grooves 17 and 19 and via the holes 27 and 29, the distribution ducts are put into communication either with a fluid feed or with a fluid discharge. Their orifices that open out in the distribution face 15A are organized, relative to the orifices of the cylinder ducts situated in the communication face of the cylinder block, in such a manner that, while the cylinder block and the casing are moving in rotation relative to each other, the cylinder ducts are put into communication in alternation with the feed and with the discharge.

Figure 1A:
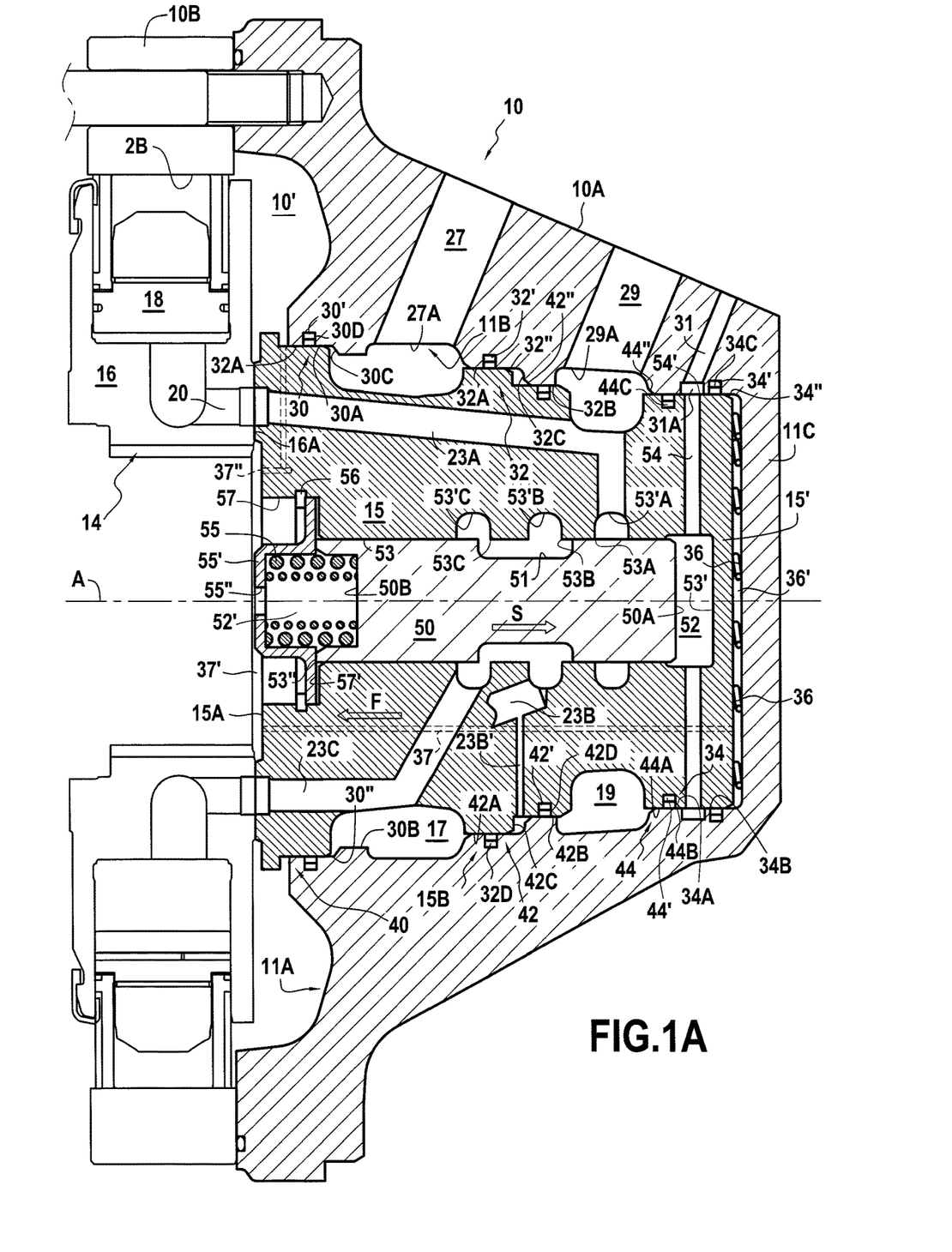
FIG. 1A is a fragmentary view taken of FIG. 1 and in which the distribution device is enlarged, showing the small cylinder capacity configuration.

In this example, the distribution ducts are arranged in three groups. FIGS. 1 and 1A show one distribution duct of each of the three groups, respectively 23A, 23B, and 23C, all three of which ducts open out in the distribution face 15A.

The internal distributor is provided with a cylinder capacity selector having a slide 50 disposed in an axial bore 53 in the body 15 of the distributor. This bore 53 is disposed at the center of the internal distributor. The distribution ducts 23A, 23B, and 23C of the three groups are connected to the bore 53 because they communicate permanently with respective selection orifices 53A, 53B and 53C that are disposed in axial succession in the bore 53. In this example, these orifices are situated in grooves in the bore, respectively grooves 53'A, 53'B, and 53'C. Orifice 53A is connected permanently to the main groove 19, while orifice 53C is connected permanently to the main groove 17. Conversely, orifice 53B is not connected permanently to these grooves. The position of the slide 50 determines which one of these grooves is connected to it, as explained below.

A control chamber 52 is situated at a first end 53' of the bore 53. It is closed, at its end opposite from the distribution face 15A, by a first end wall 15' of the distributor. More precisely, the control chamber 52 is provided between the first end wall 15' and the end 50A of the slide 50 that faces towards said end wall 15'. The control chamber 52 can be fed with fluid via a control circuit 54 that connects said chamber to a secondary hole 31 in the casing portion 10A that, in this example, opens out in the inside axial face 11B of said casing portion via a secondary orifice 31A situated beyond the second main orifice 29A in the direction going away from the open axial end 11A. At the end opposite from the chamber 52, the distributor has a return chamber 52', in which a return spring 55 is disposed that works in compression. The return chamber is closed by a second end wall of the bore that, in this example, is formed by a separate wall element, constituted by a dish 55' fastened to the body 15 of the distributor. More precisely, the second end 53" of the bore 53 is open and has a wider end 57 defined by a shoulder 57'; the dish 55' is disposed in the wider end portion 57 and is held locked against the shoulder 57' by locking means such as a circlip 56 or the like.

Thus, the spring 55 tends to urge the slide 50 to move in the direction S, while the control chamber 52 being fed with fluid tends to urge the slide to move in the opposite direction.

The body 15 of the internal distributor can be manufactured in one piece and, to finish off said distributor, it suffices to dispose the selection slide 50 in the bore 53, to put the spring 55 in place, and to fasten the dish 55'. The internal distributor equipped with the selection slide can then be manipulated as a unit.

In this example, the end wall 15' is formed in the body 15 of the distributor, integrally therewith, only the opposite end wall, formed by the dish 55', being a separate wall. The body of the distributor is thus bell-shaped. Naturally, it is possible for the bore 53 to be a through bore, and for both of its end walls to be separate. In such a situation, the first end wall could be a dish or a disk, shaped and mounted to provide the necessary sealing for the chamber 52: unlike the dish 55' that is shown, such a dish or disk would not be provided with a hole and a gasket would be interposed between the dish and the body.

It is also possible for the second end wall, which defines the return chamber 52' to be formed in the body 15 of the distributor, while only the first end wall would then be separate and mounted on the body. A gasket would then be interposed between said first wall and the body, because said first wall would define the control chamber.

To simplify manufacturing the body of the distributor, the duct 54 may be a through radial hole, passing through the body from one side to the other.

The slide 50 has a outside annular groove 51 that is referred to as the "selection groove". When the slide 50 is in the first position, shown in FIG. 1, the groove 51 causes the first and second selection orifices 53A and 53B to communicate with each other, which orifices are then not connected to the third selection orifice 53C. Therefore, the distribution ducts of the first group 23A are brought to the same pressure as the distribution ducts of the second group 23B. When the slide 50 is in the second position shown in FIG. 1A, the slide has moved in a direction indicated by arrow F, and the outside annular groove 51 causes the orifices 53B and 53C to communicate with each other, which orifices are then not connected to the first selection orifice 53A. Therefore, the distribution ducts of the second group 23B are brought to the same pressure as the distribution ducts of the third group 23C.

For example, in the normal operating situation, the main orifice 29 serves as the fluid feed, while the main orifice 27 serves as the fluid discharge. The number of distribution ducts of the third group is equal to the sum of the number of ducts of the first and second groups. When the slide 50 is in its first position (FIG. 1), all of the distribution ducts of the first and second groups 23A and 23B serve as feeds, while the distribution ducts of the third group 23C serve as discharges. The motor then operates in full cylinder capacity mode. Conversely, when the slide 50 is in the second position shown in FIG. 1A, only the distribution ducts of the first group 23A serve as feeds, while the distribution ducts of the second and third groups 23B and 23C serve as discharges. Thus, the sub-motor corresponding to the distribution ducts of the second group 23B and to the sub-group of the distribution ducts of the third group 23C that are associated with it is inactive, its distribution ducts being placed at the same pressure.

In the non-preferred operating mode, the main hole 29 serves as the discharge, while the main hole 27 serves as the feed. In this situation, when the selection slide 50 is in the second position, the distribution ducts of the second and third groups are placed at the same pressure, which is then the feed pressure. The inactivated sub-motor is then subjected to the feed pressure, so that said inactivated sub-motor can deliver resistive torque. This small cylinder capacity operating direction is then non-preferred.

It should be noted that, in this example, the casing portion 10A is bell-shaped, with an end wall 11C opposite from its open axial end 11A. In this example, said casing portion 10A is made in one piece, by casting and/or machining. Naturally, the casing portion 10A could be made in two pieces, i.e. a first piece that is open axially through from one end to the other, and a lid forming the end wall opposite from the open axial end, and mounted on said first piece.

It should be noted that the inside axial face 11B has a first sealing inside bearing surface arrangement 30, a second sealing inside bearing surface arrangement 32, and a third sealing inside bearing surface arrangement 34. The first arrangement 30 is situated between the open axial end 11A and the first main orifice 27A, the second arrangement is situated between the two main orifices 27A and 29A, and the third arrangement is situated beyond the second orifice 29A relative to the open axial end.

In the meaning of the present description, a sealing axial bearing surface is a cylindrical surface of constant radius, extending axially, and that can co-operate in sealed manner with the corresponding surface situated facing it via a sealing gasket. In the meaning of the present description, a sealing inside bearing surface arrangement is an arrangement that comprises at least one sealing inside axial surface.

It can be seen that the first sealing inside bearing surface arrangement comprises two axial bearing surfaces, respectively 30A and 30B, which are staggered relative to each other, by being separated by a shoulder 30C that faces towards the open axial end. Similarly, the second sealing inside bearing surface arrangement comprises a first axial bearing surface 32A and a second axial bearing surface 32B that are staggered relative to each other, by being separated by a shoulder 32C that also faces towards the open axial end 11A. Conversely, the third sealing inside bearing surface arrangement comprises two sealing axial surfaces, respectively 34A and 34B, that are situated at the same radius.

The bearing surface 30A of the first arrangement is provided with an annular groove 30D in which a sealing gasket 30' is disposed, in the same way as the first axial bearing surface 32A of the second arrangement 32 is provided with an annular groove 32D in which a gasket 32' is disposed. In addition, the axial bearing surface 34B of the third arrangement 34 is also provided with an annular groove 34C, in which a gasket 34' is disposed.

The two axial bearing surfaces 34A and 34B of the third inside bearing surface arrangement 34 are situated on either side of the opening 31A of the secondary hole 31A.

In addition, the outside axial face 15B of the internal distributor 15 has three sealing outside bearing surface arrangements, respectively 40, 42, and 44, which are respectively suitable for co-operating with the first, second, and third sealing inside bearing surface arrangements 30, 32, and 34 of the casing portion 10A.

At least one of the sealing outside bearing surface arrangements of the internal distributor, in this example the arrangement 42, is a staggered outside arrangement that is suitable for co-operating with one of staggered inside arrangements, in this example the arrangement 32. It can be seen that this arrangement 42 has two axial bearing surfaces, respectively 42A and 42B that are staggered relative to each other by being separated by a shoulder 42C that faces in the direction opposite from the direction in which the distribution face 15A faces. In other words, this shoulder 42C faces the shoulder 32C of the sealing inside bearing surface arrangement 32. The axial bearing surface 42A of the arrangement 42 co-operates with the axial bearing surface 32A of the arrangement 32 via the sealing gasket 32'. Similarly, the axial bearing surface 42B co-operates with the axial bearing surface 32B of the arrangement 32 via a sealing gasket. In this example, this gasket 42' is disposed in a groove 42D provided in the axial surface 42B. Thus, the space situated between the facing shoulders 32C and 42C is sealed on either side axially.

Conversely, the sealing outside bearing surface arrangement 40 has an axial bearing surface with a single axial surface that co-operates with the surface 30A of the arrangement 30, via the gasket 30'.

The sealing outside bearing surface arrangement has a single axial bearing surface, with two axial surfaces 44A and 44B that are situated on the same diameter and that co-operate with respective ones of the axial surfaces 34A and 34B, respectively via the gasket 34' and via a gasket 44' situated in a groove 44C in the axial surface 44A. The control duct 54 connects the control chamber 52 to a hole 54' in the outside axial face of the body 15, which hole is disposed in the axial bearing surface 44, between the two surfaces 44A and 44B. As a result, feeding the control chamber 52 with fluid does not generate any thrust on the distributor.

It is indicated above that the gaskets 30', 32' and 34' are situated in grooves, respectively 30D, 32D, and 34C, in the inside axial face 11B of the portion 10A of the casing. These grooves are formed in respective ones of the first, second, and third sealing inside bearing surface arrangements 30, 32, 34. The gaskets 42' and 44' are situated in grooves, respectively 42D and 44C, in the outside axial face 15B of the body 15 of the distributor.

These various gaskets are put in place in said grooves before the distributor is mounted in the casing. To achieve this mounting, the distributor is inserted into the casing by being moved axially in the direction indicated by arrow S in FIG. 1A. The outside axial face 15B of the body 15 of the distributor is provided with bevels 34", 32", and 30" that co-operate with respective ones of the gaskets 34', 32', and 30' while the distributor is being inserted into the casing, and the axial face of the casing portion 10A is provided with bevels 44" and 42" that co-operate with respective ones of the gaskets 44' and 42' during this insertion. These bevels, which could be replaced by fillets or by rounded portions, form guide surfaces that contribute to maintaining the gaskets in place in their respective grooves while the body of the distributor is being mounted in the portion 10A of the casing.

The selection orifice 53B is connected to the staggered outside arrangement 12. It can be seen that the orifice 53B is connected to the space provided between the respective shoulders 32C and 42C of the arrangements 32 and 42, via a segment of radial duct 23B' (there may be a plurality of such segments) itself connected to a distribution duct of the second group 123B. Thus, the pressure of fluid flowing through the distribution ducts of the second group presses against the shoulder 32C to act on the shoulder 42C and to tend to push the distributor back towards the communication face of the cylinder block, in the direction indicated by arrow F.

A spring 36 co-operates with the casing portion 10A and with the internal distributor to move said internal distributor away from the end wall 11C of the casing portion 10A that is opposite from its open end. This makes it possible to initiate pressing the distribution face against the communication face, this pressing being reinforced when the pressure increases while the motor is operating, by the fluid-flow pressing resulting from the pressure of fluid in the grooves 17 and 19. At the same time, the fluid pressure between the shoulders 32C and 42C contributes to this fluid-flow pressing with an appropriate force, balancing the opposing pressing resulting from the pressure of the fluid at the distribution orifices against the uninterrupted portions of the communication face. Thus, regardless of whether the motor is operating in large cylinder capacity mode or in small cylinder capacity mode, the distribution face of the distributor is pressed correctly against the communication face of the cylinder block, with the suitable balancing.

It should be noted that the spring 36 is situated between the first end wall 15' of the distributor and the end wall 11C of the casing that faces said first end wall. More precisely, the spring 36, which urges the internal distributor to press axially against the cylinder block is situated in a spring chamber 36' that is provided axially between the end wall 11C of the casing and the body 15 of the internal distributor, the first end wall 15' of said distributor thus being situated between the control chamber 52 of the slide 50 of the cylinder selector and the chamber 36' of the spring 36. This facilitates balancing of the forces due to an increase in the pressure in the control chamber 52. When, as in the example shown, the chamber 36' takes the form of a cylindrical enclosure of large diameter (corresponding to the inside diameter of the end wall 11C of the casing), this also facilitates proper distribution of the pressing forces exerted by the spring 36 on the internal distributor and contributes to overall compactness, it being possible for the spring 36 (which can take the form of a plurality of small springs distributed in the chamber 36') to occupy a plurality of radial heights of the chamber 36', while also having a small axial thickness and while having the stiffness adapted to suit its use.

If leaks occur between the casing and the internal distributor (in particular in the event that the gasket 34' fails), the pressure can increase in the chamber 36'. Combined with the spring 36, this pressure might exert thrust that is too large on the internal distributor. It can thus be desirable to drain the chamber 36'. To this end, a drainage duct 37 may connect the chamber 36' to a drainage enclosure. An example of such a drainage duct 37 is shown in dashed lines in FIG. 1A. In this example, the drainage duct takes the form of a hole, in particular an axial hole that is provided in the body 15 of the internal distributor and that connects the chamber 36' to a drainage enclosure 37' situated between the cylinder block and the distributor (in a region that is radially distinct from the zone of contact between the distribution face and the communication face), this drainage enclosure being connected to the inside space 10' of the casing via a link duct 37", and said inside space itself being connected to a pressure-free reservoir via a leakage return duct that is known per se and that is not shown. In the example shown, the drainage duct 37 and the link duct 37" are distinct, the duct 37 being formed by an axial hole, while the duct 37" is formed by an essentially radial hole. Naturally, these holes could be interconnected, e.g. to form a T-shaped hole having an axial segment that connects the chamber 36' to the enclosure 37', and a segment having at least one radial component that connects the enclosure 37' to the inside space 10' of the casing.

It should also be noted that the second end wall of the distributor, which end wall is formed, in this example, by the dish 55', is provided with a hole 55" that makes it possible to drain the return chamber 52' so as to avoid an increase in the pressure in said chamber. In this example, the hole 55" causes the return chamber 52' to communicate with the drainage enclosure 37'.

Figure 2:
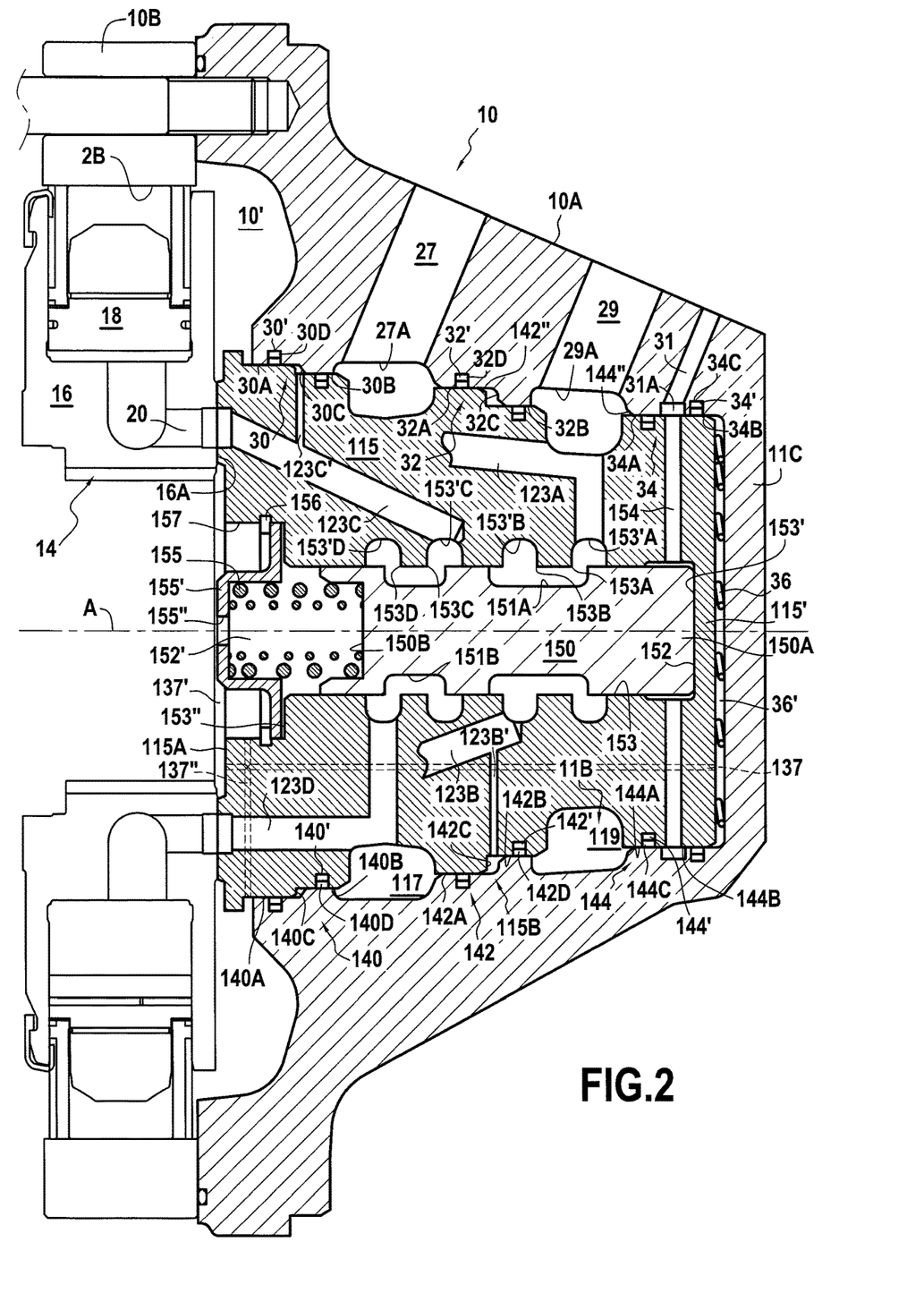
FIG. 2 is a view analogous to FIG. 1A, with an internal distributor of a second type, in the large cylinder capacity configuration.
Figure 3:
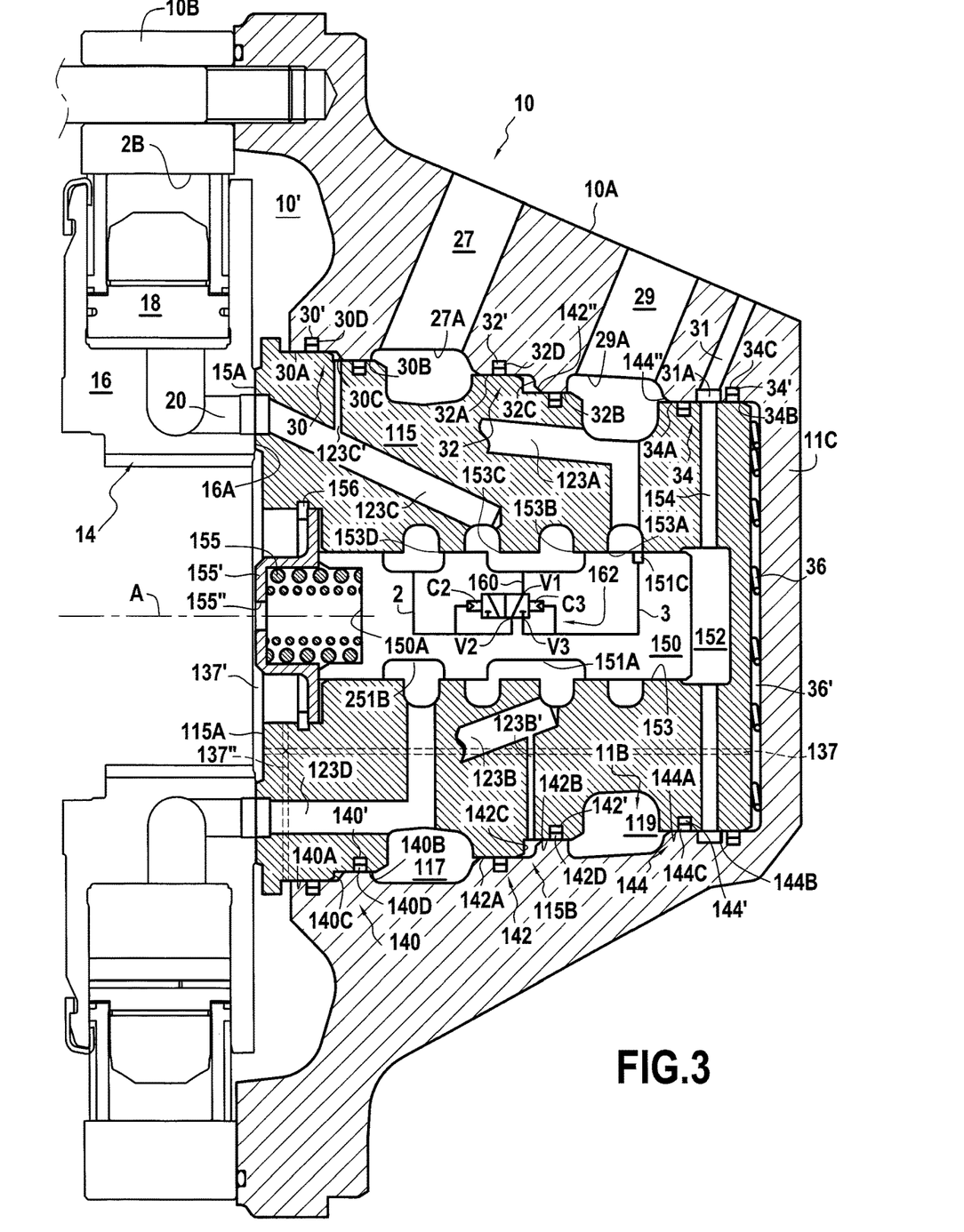
FIG. 3 is a view analogous to FIG. 2, showing the small cylinder capacity configuration.

A description follows of FIGS. 2 and 3, which show a motor that, unlike the motor shown in FIGS. 1 and 1A, does not have a preferred operating direction.

In these figures, the internal distributor 115 is disposed in the casing portion 10A that is identical to the casing portion of FIGS. 1 and 1A. The radial distribution face 115A of this distributor is situated in the vicinity of the open axial end 11A of the casing portion 10A and presses against the communication face 16A of the cylinder block. The outside axial face 115B of the distributor faces the inside axial face 11B of the casing portion 10A. This outside axial face 115B has two main grooves, respectively 117 and 119, facing respective ones of the first and second main orifices 27 and 29. It also has three sealing outside bearing surface arrangements, respectively 140, 142, and 144.

These sealing outside bearing surface arrangements are respectively suitable for co-operating with the first, second, and third sealing inside bearing surface arrangements 30, 32, and 34 of the casing portion 10A.

This internal distributor 115 is provided with distribution ducts that open out in the distribution face 115A and that are configured to be connected to one or the other of the main grooves 117 and 119 via a selection slide 150 mounted to move in an axial bore 153 of the distributor.

Before describing the slide in more detail, it should be noted that the two sealing outside bearing surface arrangements 140 and 142 are staggered arrangements. Each of them has two axial bearing surfaces, respectively 140A & 140B and 142A & 142B, the two bearing surfaces of each of them being staggered relative to each other by being separated by a respective shoulder 140C, 142C that faces in the direction opposite from the direction in which the distribution face 115A faces. The sealing outside bearing surface arrangements 140 and 142 that are staggered co-operate with respective ones of the staggered sealing inside bearing surface arrangements 30 and 32. The shoulders 140C and 142C are situated facing respective ones of the shoulders 30C and 32C. Conversely, the third sealing outside bearing surface arrangement 144 comprises two sealing axial bearing surfaces, respectively 144A and 144B, that are situated at the same diameter. The two axial surfaces co-operate with respective ones of the two axial surfaces 34A and 34B of the third sealing inside bearing surface.

In addition, in its axial surface 140B, the arrangement 140 has a groove 140D in which a sealing gasket 140' is situated, and, similarly, the axial surface 142B has a groove 142D in which a gasket 142' is situated. Thus, the spaces situated between the shoulders 140C and 30C are sealed on either side by the gaskets 30' and 140', and, similarly, the space situated between the shoulders 142C and 32C is sealed on either side by the gaskets 32' and 142'. The axial surface 144A has a groove 144C in which a sealing gasket 144' is situated. Thus, the orifice 31A of the secondary hole 31, which communicates with a control duct 154 (which is analogous to the duct 54 in the preceding figures) of the distributor 115, is sealed on either side by the gaskets 144' and 34'. The control duct 154 opens out in the outside axial face 115B of the body 115 of the distributor via a hole 154' situated between the surfaces 144A and 144B.

The secondary hole thus serves to feed the control chamber 152 of the cylinder capacity selector, which chamber is situated at that end 153' of the bore 153, and is defined between the first end wall 115' of the distributor and the end 150A of the selection slide 150 that is opposite from the distribution face 115A.

The internal central axial bore 153 of the distributor 115 has four selection orifices, respectively 153A, 153B, 153C, and 153D, which are disposed in succession axially. These orifices open out into annular grooves, respectively 153'A, 153'B, 153'C and 153'D. Each of the selection orifices is connected to a group of distribution ducts. FIG. 2 thus shows a distribution duct 123A of the first group connected to the orifice 153A, a distribution duct 123B of the second group connected to the orifice 153B, a distribution duct 233C of the third group connected to the orifice 153C, and a distribution duct 123D of the fourth group connected to the orifice 153D. The selection orifice 153B is connected to the staggered outside arrangement 142 via a duct segment 123B' that extends between the duct 123B and the space between the shoulders 32C and 142C. Similarly, the selection orifice 153C is connected to the staggered outside arrangement 140 via a duct segment 123C' that extends between the duct 123C and the space between the shoulders 30C and 140C.

In FIG. 2, the slide 150 occupies its first position, in which the selection orifices are interconnected in pairs. The orifices 153A and 153B are interconnected while being isolated from the other two, while the orifices 153C and 153D are interconnected while being isolated from the other two. The selection orifice 153A is also connected permanently to the groove 119 and thus to the main orifice 29, and similarly the selection orifice 153D is connected permanently to the groove 117 and thus to the main orifice 27. Therefore, when the slide is in the first position as shown in FIG. 2, the distribution ducts of the first and second groups 123A, 123B are all connected to the main orifice 29, while the distribution ducts of the third and fourth groups, 123C and 123D, are all connected to the main orifice 27.

More precisely, the selection slide 150 has two selection grooves, respectively 151A and 151B, which, when the slide is in the first position as shown in FIG. 2, respectively interconnect the selection orifices 153A and 153B, and the selection orifices 153C and 153D. The operating mode is then the large cylinder capacity mode, the rotor of the motor rotating in one direction or in the opposite direction depending on whether the main orifices 27 and 29 serve respectively as feed or as discharge, or vice versa.

It should be noted that the two selection orifices 153B and 153D that are connected to respective ones of the staggered arrangements 140 and 142 are not interconnected via the selection slide 150 when said slide is in the first position as shown in FIG. 2.

Conversely, when the slide 150 is in the second position as shown in FIG. 3, the groove 151A interconnects the second and third selection orifices 153B and 153C. In this situation, the selection groove 151B is disposed facing the third selection orifice 153D only.

The selection slide 150 is caused to go from its first position to its second position by feeding the control chamber 152 with fluid, via the secondary hole 31 and via the hole 154 in the distributor 115. This fluid pressure opposes the return force exerted by a spring 155 disposed at the opposite end of the selection slide 150. As in the example shown in FIGS. 1 and 1A, said spring is situated in a return chamber 152' situated at the second end 153" of the bore 153 and presses firstly against the end 150B of the slide 150 that is opposite from the chamber 152 and secondly against a dish 155' fastened to the body 115 of the distributor via a circlip or the like 156, by cooperation with a shoulder 157' defining a wider end portion 157 of the bore.

Thus, the shape of the bore 153 is analogous to the shape of the bore 53 shown in FIGS. 1 and 1A, as regards its first and second end walls 115' and 155'. The same variant embodiments of these walls are possible as those mentioned above with reference to FIGS. 1 and 1A.

The selection slide includes a link 160 that, in its second position as shown in FIG. 3, interconnects the two selection orifices 153B and 153C, and a link selector 162 that, when the slide 150 is in the second position, connects said link 160 to that one of the other two selection orifices 153A and 153D that is at the lower pressure. To simplify the drawings, only the link 160 and the selector 162 are shown in FIG. 3. This selector 162 is shown highly diagrammatically. It is a two-position, three-port valve, its outlet port V1 being connected to the link 160 that is itself connected to the selection groove 151A in such a manner as to be connected to the orifices 153B and 153C when the slide 150 is in its second position. The selector 162 has two inlet ports, respectively V2 and V3. In the example shown in FIG. 3, the port V2 is connected to the groove 151B in such a manner as to be connected to the selection orifice 153D when the slide 150 is in the second position. The second inlet port V3 of the selector 162 is connected to an additional groove 151C of the slide 150 that, in the position shown in FIG. 3, is in register with the orifice 153A. The ducts 2 and 3, which connect respective ones of the ports V2 and V3 to the grooves 151B and 151C, are also connected to respective control chambers C2 and C3. In the example shown, the pressure in the hole 29 that serves as the feed is greater than the pressure in the hole 27 that serves as the discharge. Therefore, the pressure in the control chamber C3 is greater than the pressure in the control chamber C2, and the selector 162 is placed in the position shown in FIG. 3, in which position, it puts the ports V2 and V1 into communication with each other, while isolating them from the port V3. Thus, the link 160 is connected to the main orifice 27 that is at the lower pressure. It can be understood that, if the pressure in the main orifice 27 becomes greater than the pressure in the main orifice 29, the selector 162 moves to its second position, in which it puts the ports V1 and V3 into communication with each other, so as to place the link 160 at the low pressure of orifice 29.

In the situation shown in FIG. 3, only the selection orifice 153A is connected to the high pressure of the main orifice 29, so that only the distribution ducts of the first group 123A are put at the high pressure. Conversely, the distribution ducts of the second and third groups, respectively 123B and 123C are connected to the distribution ducts of the fourth group 123D via the link 160 and the selector 162, and are thus put at the low pressure of the main orifice 27. Thus, the distribution ducts of the second and third groups 123B and 123C are placed at the same pressure, which is the discharge pressure, and the corresponding sub-motor is deactivated. It can be understood that the pressure reverses at the main orifices 27 and 29, and it is then the orifice 29 that serves as the discharge, and, via the selector 162, the link 160 is then connected to the low pressure of the orifice 29, and the deactivated sub-motor, corresponding to the distribution ducts 123B and 123C, is also put at the low pressure.

In FIGS. 2 and 3, as in the preceding figures, the spring 36 co-operates with that end of the distributor 115 that is opposite from the distribution face 115A so as to achieve first pressing of the distribution face against the communication face. Under the effect of the fluid pressure in the distribution ducts, this first pressing is supplemented by hydraulic pressing, achieved by the fluid pressure exerted on the walls of the grooves 117 and 119, and also on the shoulders 142C and 140C facing the shoulders 32C and 30C. Thus, even when the sub-motor corresponding to the distribution ducts of the second and third groups is deactivated, the hydraulic pressing is balanced.

As in FIG. 1A, the spring 36 is situated between the first end wall 115' of the distributor and the end wall 11C of the casing that faces said first end wall, while being situated in a chamber 36' provided axially between the end wall 11C of the casing and the body 115 of the internal distributor, the first end wall 115' of said distributor thus being situated between the control chamber 152 of the slide 150 of the cylinder capacity selector and the chamber 36' of the spring 36.

In addition, a drainage duct 137 connects the chamber 136' to a drainage enclosure 137' situated between the cylinder block and the distributor connected to the inside space 10' of the casing via a link duct 137". In this example, the drainage duct 137 and the link duct 137" are formed by a T-shaped hole having an axial segment that connects the chamber 36' to the enclosure 137' and a radial segment that connects the enclosure 137' to the inside space 10' of the casing.

The dish 155' is provided with a hole 155" that enables the return chamber 152' to be drained. In this example, the hole 55" causes the return chamber 52' to communicate with the drainage enclosure 37'.

In addition, the outside axial face 115B of the body 15 of the distributor is provided with bevels, analogous to the bevels 34", 32", and 30" described with reference to FIG. 1A, that co-operate with respective ones of the gaskets 34', 32', and 30' while the distributor is being inserted into the casing, and the axial face of the casing portion 10A is provided with bevels 144" and 142" that co-operate with respective ones of the gaskets 144' and 142' during this insertion.

The invention claimed is:

1. A distribution device for a hydraulic machine, the device comprising: an internal distributor configured to be disposed in a casing portion, the internal distributor comprising a body having an outside axial face provided with two main grooves respectively for fluid feed and for fluid discharge, and a distribution radial face, the internal distributor having distribution ducts that open out in the distribution radial face, the device further comprising a cylinder capacity selector that comprises a slide suitable for being moved in an axial bore in the internal distributor for connecting the distribution ducts to one or the other of the main grooves, the device further comprising a control chamber suitable for being fed with fluid to cause the slide to be moved, and at least one return spring exerting an opposing force that opposes such movement, the control chamber being situated at a first end of the axial bore and is closed, at an end opposite from the distribution radial face by a first end wall of the internal distributor, the control chamber being provided between said first end wall and a first end of the slide that faces towards said first end wall, and the return spring being disposed in a return chamber situated at a second end of the axial bore and closed by a second end wall of the distributor, the device further comprising a thrust spring that co-operates with the casing portion and the internal distributor to move said internal distributor away from an end wall of the casing portion, the thrust spring being arranged in a spring chamber that is provided axially between the first end wall of the internal distributor and the end wall of the casing portion, so that the first end wall of the internal distributor is situated axially between the control chamber and the spring chamber.

2. The device as claimed in claim 1, wherein the axial bore is disposed at a center of the internal distributor.

3. The device as claimed in claim 1, wherein the distribution ducts and the axial bore are formed integrally in one piece forming said body of the internal distributor, wherein at least one of the first and second end walls is formed by a wall element that is separate and mounted on said body at one end of the axial bore.

4. The device as claimed in claim 3, wherein the axial bore is a blind bore, one of the first and second end walls being formed in the body.

5. The device as claimed in claim 3, wherein the wall element co-operates with the body via a sealing gasket.

6. The device as claimed in claim 3, wherein the axial bore is a blind bore, the first end wall being formed in the body.

7. The device as claimed in claim 1, wherein at least one of the ends of the axial bore is an open end that has a wider end portion defined by a shoulder, a separate wall element disposed in the wider end portion and held locked against the shoulder forming an end wall of said open end.

8. The device as claimed in claim 1, wherein the body is provided with a control duct that connects the control chamber to a hole in the outside axial face of the body, wherein the hole is disposed in a single cylindrical bearing surface of said outside axial face that defines an axial surface having a constant diameter.

9. The device as claimed in claim 1, wherein the spring chamber is connected via a drainage duct to a drainage enclosure.

10. The device as claimed in claim 9, wherein the drainage duct is formed by a bore in the body of the internal distributor.

11. The device as claimed in claim 6, wherein the second end wall of the distributor is provided with a hole to enable the return chamber to be drained.

12. The device as claimed in claim 6, wherein the second end of the axial bore is an open end that has a wider end portion defined by a shoulder, a separate wall element disposed in the wider end portion and held locked against the shoulder forming an end wall of said open end.

\* \* \* \* \*

UNITED STATES PATENT AND TRADEMARK OFFICE
CERTIFICATE OF CORRECTION

PATENT NO. : 10,563,641 B2
APPLICATION NO. : 15/329828
DATED : February 18, 2020
INVENTOR(S) : Julien Viard Page 1 of 1

It is certified that error appears in the above-identified patent and that said Letters Patent is hereby corrected as shown below:

In the Claims

Column 13, Line 15, Claim 11, delete "claim 6," and insert -- claim 1, --

Column 13, Line 18, Claim 12, delete "claim 6," and insert -- claim 1, --

Signed and Sealed this
Twelfth Day of May, 2020

Andrei Iancu
*Director of the United States Patent and Trademark Office*